United States Patent
Tsai et al.

(10) Patent No.: US 11,008,222 B2
(45) Date of Patent: May 18, 2021

(54) METAL BRONZE COMPOUND, MANUFACTURING METHOD THEREOF, AND INK

(71) Applicant: Winbond Electronics Corp., Taichung (TW)

(72) Inventors: Ming-Chih Tsai, Taichung (TW); Yu-Hsuan Ho, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 15/800,082

(22) Filed: Nov. 1, 2017

(65) Prior Publication Data

US 2018/0162742 A1 Jun. 14, 2018

(30) Foreign Application Priority Data

Dec. 13, 2016 (CN) .......................... 201611145299.5

(51) Int. Cl.
*C01G 55/00* (2006.01)
*C09D 11/52* (2014.01)
*C01B 13/36* (2006.01)
*C01G 1/02* (2006.01)

(52) U.S. Cl.
CPC .......... *C01G 55/002* (2013.01); *C01B 13/363* (2013.01); *C01G 1/02* (2013.01); *C09D 11/52* (2013.01)

(58) Field of Classification Search
None
See application file for complete search history.

(56) References Cited

U.S. PATENT DOCUMENTS

| 6,162,498 A | 12/2000 | Mennig et al. |
| 2005/0191492 A1* | 9/2005 | Yadav .................... C09C 1/3684 428/407 |
| 2006/0134347 A1 | 6/2006 | Chiruvolu et al. |

(Continued)

FOREIGN PATENT DOCUMENTS

| CN | 1034963 | 8/1989 |
| CN | 101454477 | 6/2009 |
| CN | 102395707 | 3/2012 |

(Continued)

OTHER PUBLICATIONS

David Horwat, et al., "Efficient, Low Cost Synthesis of Sodium Platinum Bronze NaxPt3O4." Chemistry of Materials, 24, pp. 2429-2432. (Year: 2012).*

(Continued)

*Primary Examiner* — Colin W. Slifka
(74) *Attorney, Agent, or Firm* — JCIPRNET

(57) ABSTRACT

A metal bronze compound is provided. The metal bronze compound is a compound represented by formula (1) below. In formula (1), "A" represents at least one type of cation. "M" represents at least two types of ions selected from a transition metal and a metalloid. "x" represents the sum of the number of the at least one type of cation used as "A". "y" represents the sum of the number of the at least two types of ions selected from the transition metal and the metalloid used as "M". "z" represents the number of oxygen ion. The values of "x", "y" and "z" balance the charge number of formula (1).

$$A_xM_yO_z \qquad (1)$$

7 Claims, 1 Drawing Sheet

```
┌─────────────────────────────────────┐
│ Mix at least two types of precursors │
│ selected from a transition metal     │──── S100
│ precursor and a metalloid precursor  │
│ and a cation precursor in a solvent  │
└─────────────────────────────────────┘
                   │
                   ▼
┌─────────────────────────────────────┐
│ React the at least two types of      │
│ precursors of the transition metal   │
│ precursor and the metalloid precursor│──── S102
│ and the cation precursor to obtain a │
│ metal bronze compound represented    │
│ by formula (1)                       │
└─────────────────────────────────────┘
```

(56) References Cited

U.S. PATENT DOCUMENTS

2016/0178804 A1* 6/2016 Shen .................. C01G 39/02
252/587

FOREIGN PATENT DOCUMENTS

| CN | 104341000 | * | 2/2015 |
|----|-----------|---|--------|
| TW | 200711988 |   | 4/2007 |
| TW | 201107244 |   | 3/2011 |
| TW | I437753   |   | 5/2014 |
| TW | 201631205 |   | 9/2016 |
| WO | WO2016097396 | * | 6/2016 |

OTHER PUBLICATIONS

"Office Action of Taiwan Counterpart Application," dated Nov. 16, 2017, p. 1-p. 5, in which the listed reference was cited.
"Office Action of China Counterpart Application," dated Sep. 4, 2019, p. 1-p. 8.

* cited by examiner

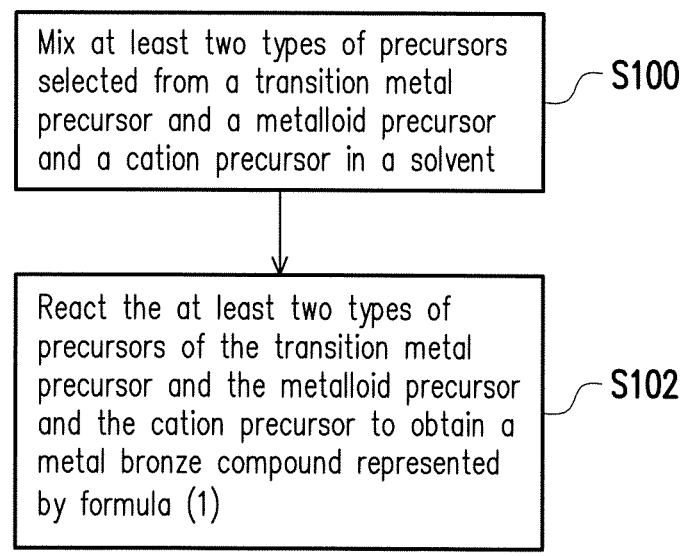

METAL BRONZE COMPOUND, MANUFACTURING METHOD THEREOF, AND INK

CROSS-REFERENCE TO RELATED APPLICATION

This application claims the priority benefit of China application serial no. 201611145299.5, filed on Dec. 13, 2016. The entirety of the above-mentioned patent application is hereby incorporated by reference herein and made a part of this specification.

BACKGROUND OF THE INVENTION

Field of the Invention

The invention relates to a compound, a manufacturing method of the compound, and an ink having the compound, and more particularly, to a metal bronze compound, a manufacturing method of the metal bronze compound, and an ink having the metal bronze compound.

Description of Related Art

The metal oxide has stable properties and is extensively applied, and is an indispensable key material today. Among metal oxides, the metal bronze compound is also extensively applied in various fields. For instance, the metal bronze compound can be used in the manufacture of, for instance, a protective film or a sensing film. However, how to effectively improve the physical properties of the metal bronze compound is an object of ongoing effort in the industry.

SUMMARY OF THE INVENTION

The invention provides a metal bronze compound that can achieve better physical properties.

The invention provides a manufacturing method of a metal bronze compound that can manufacture a metal bronze compound at room temperature.

The invention provides an ink that can achieve better physical properties.

The invention provides a metal bronze compound represented by formula (1) below.

$$A_xM_yO_z \quad (1)$$

In formula (1), "A" represents at least one type of cation, wherein the at least one type of cation used as "A" comprises a hydrogen ion, an alkali metal ion, an alkaline earth metal ion, a rare earth metal ion, an ammonium ion, or a combination thereof. "M" represents at least two types of ions selected from a transition metal and a metalloid, wherein the transition metal comprises titanium, zirconium, hafnium, molybdenum, tungsten, vanadium, copper, iron, cobalt, nickel, manganese, niobium, tantalum, rhenium, ruthenium, platinum, or a combination thereof, and the metalloid comprises silicon, boron, germanium, arsenic, or a combination thereof. "x" represents the sum of the number of the at least one type of cation used as "A". "y" represents the sum of the number of the at least two types of ions selected from the transition metal and the metalloid used as "M". "z" represents the number of oxygen ions. The values of "x", "y" and "z" balance the charge number of formula (1).

The invention provides a manufacturing method of a metal bronze compound including the following steps. At least two types of precursors selected from a transition metal precursor and a metalloid precursor and a cation precursor are mixed in a solvent. The at least two types of precursors of the transition metal precursor and the metalloid precursor and the cation precursor are reacted to obtain a metal bronze compound represented by formula (1).

$$A_xM_yO_z \quad (1)$$

In formula (1), "A" represents at least one type of cation. "M" represents at least two types of ions selected from a transition metal and a metalloid. "x" represents the sum of the number of the at least one type of cation used as "A". "y" represents the sum of the number of the at least two types of ions selected from the transition metal and the metalloid used as "M". "z" represents the number of oxygen ions. The values of "x", "y" and "z" balance the charge number of formula (1).

The invention provides an ink including the metal bronze compound above.

Based on the above, in the metal bronze compound provided in the invention, since "M" in formula (1) represents at least two types of ions selected from a transition metal and a metalloid, the metal bronze compound can achieve better physical properties. Moreover, the manufacturing method of the metal bronze compound provided in the invention can be performed at room temperature. Moreover, since the ink provided in the invention has the metal bronze compound, the ink can achieve better physical properties and is suitable for various wet processes without producing additional manufacturing costs and manufacture difficulty.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a manufacturing flowchart of a metal bronze compound of an embodiment of the invention.

DESCRIPTION OF THE EMBODIMENTS

The present embodiment provides a metal bronze compound represented by formula (1) below.

$$A_xM_yO_z \quad (1)$$

In formula (1), "A" represents at least one type of cation. The cation used as "A" is, for instance, a hydrogen ion, alkali metal ion, alkaline earth metal ion, rare earth metal ion, ammonium ion, or a combination thereof. For instance, the cation can be a hydrogen (H) ion, lithium (Li) ion, sodium (Na) ion, potassium (K) ion, rubidium (Rb) ion, cesium (Cs) ion, silver (Ag) ion, or a combination thereof. However, the cation used as "A" of the invention is not limited to the cations above.

"M" represents at least two types of ions selected from a transition metal and a metalloid. The transition metal is, for instance, titanium (Ti), zirconium (Zr), hafnium (Hf), molybdenum (Mo), tungsten (W), vanadium (V), copper (Cu), iron (Fe), cobalt (Co), nickel (Ni), manganese (Mn), niobium (Nb), tantalum (Ta), rhenium (Re), ruthenium (Ru), platinum (Pt), or a combination thereof, but the invention is not limited thereto. The metalloid is, for instance, silicon (Si), boron (B), germanium (Ge), arsenic (As), or a combination thereof, but the invention is not limited thereto.

"x" represents the sum of the number of the at least one type of cation used as "A". "y" represents the sum of the number of the at least two types of ions selected from the transition metal and the metalloid used as "M". "z" represents the number of oxygen ions. The values of "x", "y" and "z" balance the charge number of formula (1).

It can be known from the above embodiments that, in the metal bronze compound, since "M" in formula (1) represents at least two types of ions selected from the transition metal and the metalloid, the metal bronze compound can achieve better physical properties. For instance, the metal bronze compound of the present embodiment can achieve better physical properties such as high conductive properties, adjustable refractive index, or visible light absorption. Moreover, the metal bronze compound of the present embodiment can be made at room temperature.

FIG. 1 is a manufacturing flowchart of a metal bronze compound of an embodiment of the invention.

Referring to FIG. 1, step S100 is performed to mix at least two types of precursors selected from a transition metal precursor and a metalloid precursor and a cation precursor in a solvent.

The transition metal precursor is, for instance, transition metal alkoxide, and the metalloid precursor is, for instance, metalloid alkoxide, but the invention is not limited thereto. The alkoxide can have one or more alkoxy groups. For instance, the alkoxide can be methoxide, ethoxide, propoxide, butoxide, isopropoxide, isobutoxide, 2-ethylhexyloxide, oxytrimethoxide, oxytriethoxide, oxytripropoxide, oxytriisopropoxide, or a combination thereof.

Moreover, in the transition metal precursor, the transition metal is, for instance, titanium (Ti), zirconium (Zr), hafnium (Hf), molybdenum (Mo), tungsten (W), vanadium (V), copper (Cu), iron (Fe), cobalt (Co), nickel (Ni), manganese (Mn), niobium (Nb), tantalum (Ta), rhenium (Re), ruthenium (Ru), platinum (Pt), or a combination thereof, but the invention is not limited thereto. In the metalloid precursor, the metalloid is, for instance, silicon (Si), boron (B), germanium (Ge), arsenic (As), or a combination thereof, but the invention is not limited thereto. The cation precursor is, for instance, metal acetylacetonate, metal acetate, metal carbonate, metal bicarbonate, hydrogen peroxide, or a combination thereof, but the invention is not limited thereto. In the cation precursor, the cation is, for instance, a hydrogen ion, an alkali metal ion, an alkaline earth metal ion, a rare earth metal ion, an ammonium ion, or a combination thereof. For instance, the cation can be hydrogen (H) ion, lithium (Li) ion, sodium (Na) ion, potassium (K) ion, rubidium (Rb) ion, cesium (Cs) ion, silver (Ag) ion, or a combination thereof. However, the cation in the cation precursor of the invention is not limited to the cations above.

The solvent can adopt one or a plurality types of solvents. For instance, the solvent can be water, methanol, ethanol, 2-propanol, or a combination thereof.

In the mixed solution of the at least two types of precursors selected from the transition metal precursor and the metalloid precursor, the cation precursor, and the solvent, the molar concentration of the at least two types of precursors selected from the transition metal precursor and the metalloid precursor is, for instance, 0.001 M to 5 M, and the molar concentration of the cation precursor is, for instance, 0.004 M to 40 M.

Step S102 is performed to react the at least two types of precursors of the transition metal precursor and the metalloid precursor and the cation precursor to obtain a metal bronze compound represented by formula (1). Formula (1) is described in detail above and is therefore not repeated herein.

$$A_xM_yO_z \tag{1}$$

The reaction can be performed at room temperature, and at this point, the reaction and aging occur at the same time. Room temperature can generally be defined as 4° C. to 40° C. Specifically, a self-generated irreversible chemical reaction occurs to the precursors after mixing at room temperature to produce a metal bronze compound. Moreover, during the reaction process, additional heating, acid, or base is not needed, and a violent exothermic reaction does not occur, and therefore an ice bath is not needed as the reaction can end on its own.

When the reaction is performed at room temperature, the reaction time is, for instance, 6 hours to 28 days. For instance, the reaction time can be 24 hours, 48 hours, 72 hours, or 92 hours, but the invention is not limited thereto. Those having ordinary skill in the art can adjust the reaction time according to process requirements.

Moreover, if a faster reaction is desired, then the reaction can also be performed at low temperature. That is, the mixed solution can be heated to a low temperature range to perform the reaction. The low temperature can generally be defined as greater than 40° C. and 200° C. or less, such as greater than 40° C. and 180° C. or less. When the reaction is performed at low temperature, the reaction time is, for instance, 5 minutes to 96 hours, but the invention is not limited thereto. Those having ordinary skill in the art can adjust the reaction time according to process requirements.

Moreover, after the reaction is performed at low temperature, the mixed solution can be cooled to room temperature for aging. The aging time is, for instance, 0 minutes to 14 days. For instance, the aging time can be 24 hours, 48 hours, 72 hours, or 92 hours, but the invention is not limited thereto. Those having ordinary skill in the art can adjust the aging time according to process requirements.

After the reaction is performed, the mixed solution having a metal bronze compound can be used as ink. In other embodiments, the mixed solution having a metal bronze compound can also be used as ink after other solvents and/or additives are optionally added in the mixed solution having the metal bronze compound to further adjust the viscosity, tension, volatility, post-film-forming porosity, and film uniformity and adhesion of the ink. Therefore, the ink of the present embodiment includes a metal bronze compound, and can further include a solvent. Moreover, the ink can further optionally include other solvents and/or additives to adjust the properties of the ink.

Moreover, the ink of the present embodiment can be used to form various functional films such as a protective film, sensing film (such as an organic volatile gas sensing film), or a photocatalytic film. Since the ink of the present embodiment has the metal bronze compound, the ink can achieve better physical properties and is suitable for various wet processes without producing additional manufacturing costs and manufacture difficulty. The forming method of the film includes, for instance, performing deposition on the ink. The method of ink deposition includes, for instance, printing, spin coating, spray coating, dip coating, or roll-to-roll. The printing includes, for instance, 3D printing, inkjet printing, gravure printing, screen printing, elastic printing, or lithography.

Moreover, since the film thickness of the wet film having the metal bronze compound formed by the ink is changed during the forming of a dry film, if other deposition materials are first formed on the substrate, then changes to the film thickness results in denser and flatter deposited materials due to the capillary phenomenon. Moreover, if the original deposition materials are less stable, then the forming of a metal bronze compound film on the surface of the deposited materials can provide a protection effect.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A metal bronze compound represented by formula (1) below, $$A_xM_yO_z \qquad (1)$$

in formula (1),
"A" represents at least one type of cation, wherein the at least one type of cation used as "A" comprises a hydrogen ion, an alkali metal ion, an alkaline earth metal ion, a rare earth metal ion, an ammonium ion, or a combination thereof,
"M" represents at least two types of ions selected from a transition metal and a metalloid, wherein the transition metal comprises titanium, zirconium, hafnium, molybdenum, tungsten, vanadium, copper, iron, cobalt, nickel, manganese, niobium, tantalum, rhenium, ruthenium, platinum, or a combination thereof, and the metalloid comprises silicon, boron, germanium, arsenic, or a combination thereof,
"x" is a sum of a number of the at least one type of cation used as "A", "y" is a sum of a number of the at least two types of ions selected from the transition metal and the metalloid used as "M", and "z" is a number of an oxygen ion, and
values of "x", "y" and "z" balance a charge number of formula (1).

2. The metal bronze compound of claim 1, wherein the at least one type of cation used as "A" comprises a lithium ion, a sodium ion, a potassium ion, a rubidium ion, a cesium ion, a silver ion, or a combination thereof.

3. An ink, comprising the metal bronze compound of claim 1.

4. A manufacturing method of a metal bronze compound, comprising:
mixing a cation precursor and at least two types of precursors selected from a transition metal precursor and a metalloid precursor in a solvent; and
reacting the cation precursor and the at least two types of precursors of the transition metal precursor and the metalloid precursor to obtain a metal bronze compound represented by formula (1) below, $$A_xM_yO_z \qquad (1)$$

in formula (1),
"A" represents at least one type of cation, wherein the at least one type of cation used as "A" comprises a hydrogen ion, an alkali metal ion, an alkaline earth metal ion, a rare earth metal ion, an ammonium ion, or a combination thereof,
"M" represents at least two types of ions selected from a transition metal and a metalloid, wherein the at least two types of ions comprise the transition metal and the metalloid, the transition metal is selected from a group consisting of titanium, zirconium, hafnium, vanadium, copper, iron, cobalt, nickel, manganese, niobium, tantalum, rhenium, ruthenium, and platinum, and the metalloid is selected from a group consisting of silicon, boron, germanium, and arsenic,
"x" is a sum of a number of the at least one type of cation used as "A", "y" is a sum of a number of the at least two types of ions selected from the transition metal and the metalloid used as "M", and "z" is a number of an oxygen ion, and
values of "x", "y" and "z" balance a charge number of formula (1).

5. The manufacturing method of the metal bronze compound of claim 4, wherein the transition metal precursor comprises transition metal alkoxide, and the metalloid precursor comprises metalloid alkoxide.

6. The manufacturing method of the metal bronze compound of claim 4, wherein the cation precursor comprises metal acetylacetonate, metal acetate, metal carbonate, metal bicarbonate, hydrogen peroxide, or a combination thereof.

7. The manufacturing method of the metal bronze compound of claim 4, wherein the reaction is performed at room temperature or low temperature.

* * * * *